Dec. 8, 1925.
W. C. KENYON
LATHE
Filed Nov. 10, 1920    9 Sheets-Sheet 5
1,564,483
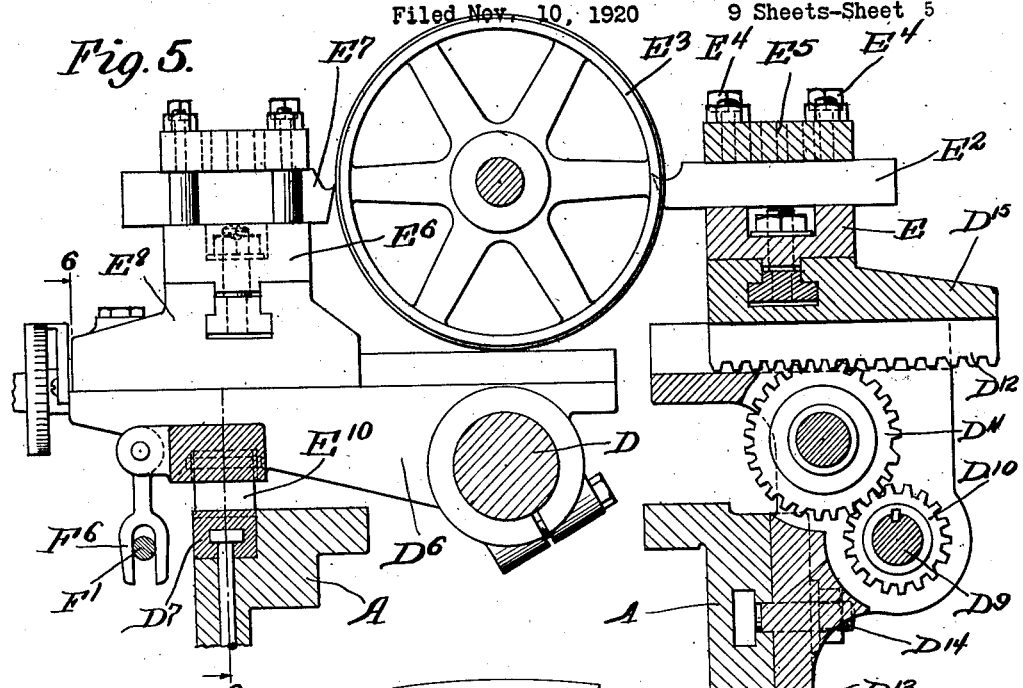
Witness
Edward T. Wray.
Inventor
William C. Kenyon
by Parker & Carter
Attorneys

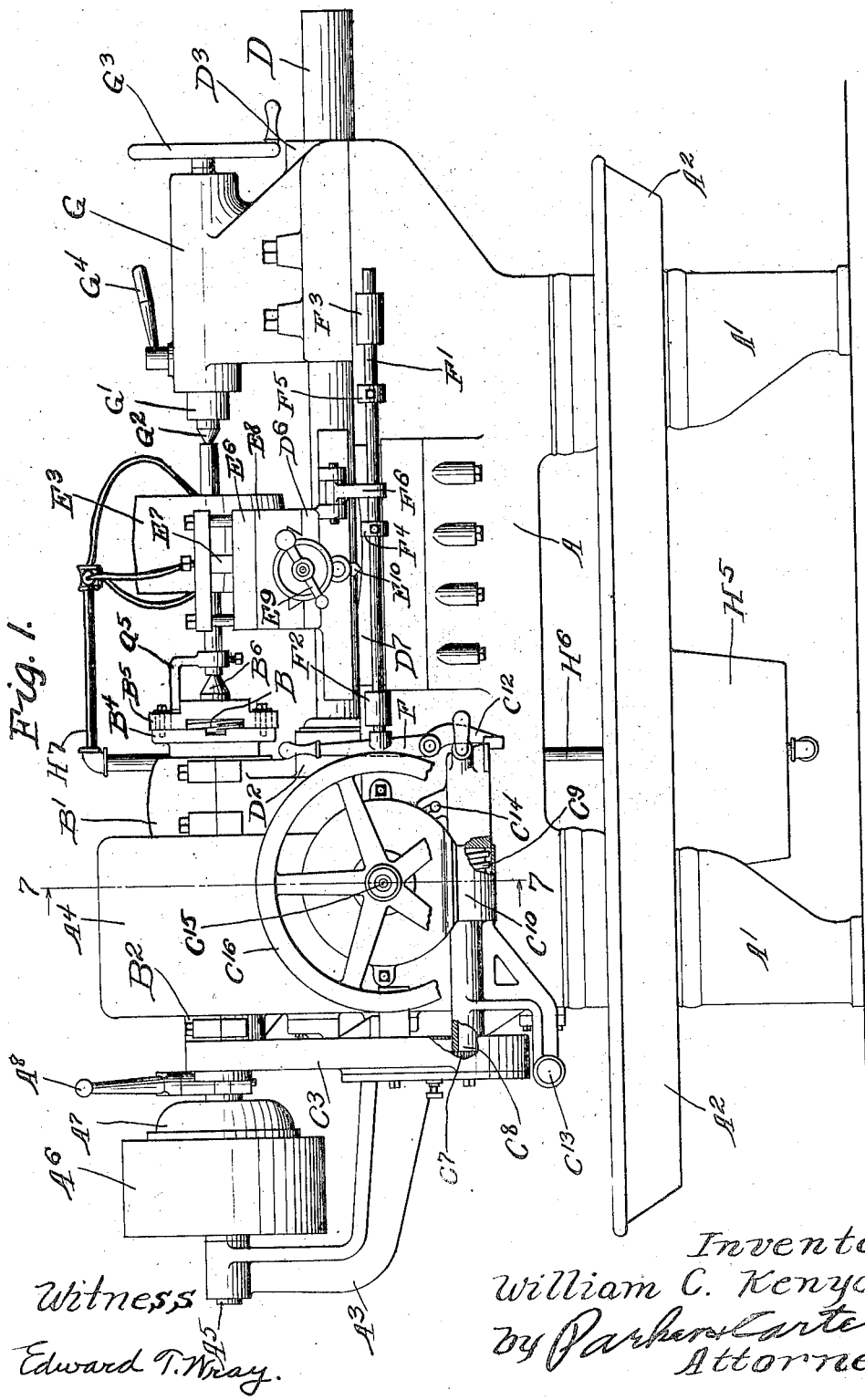

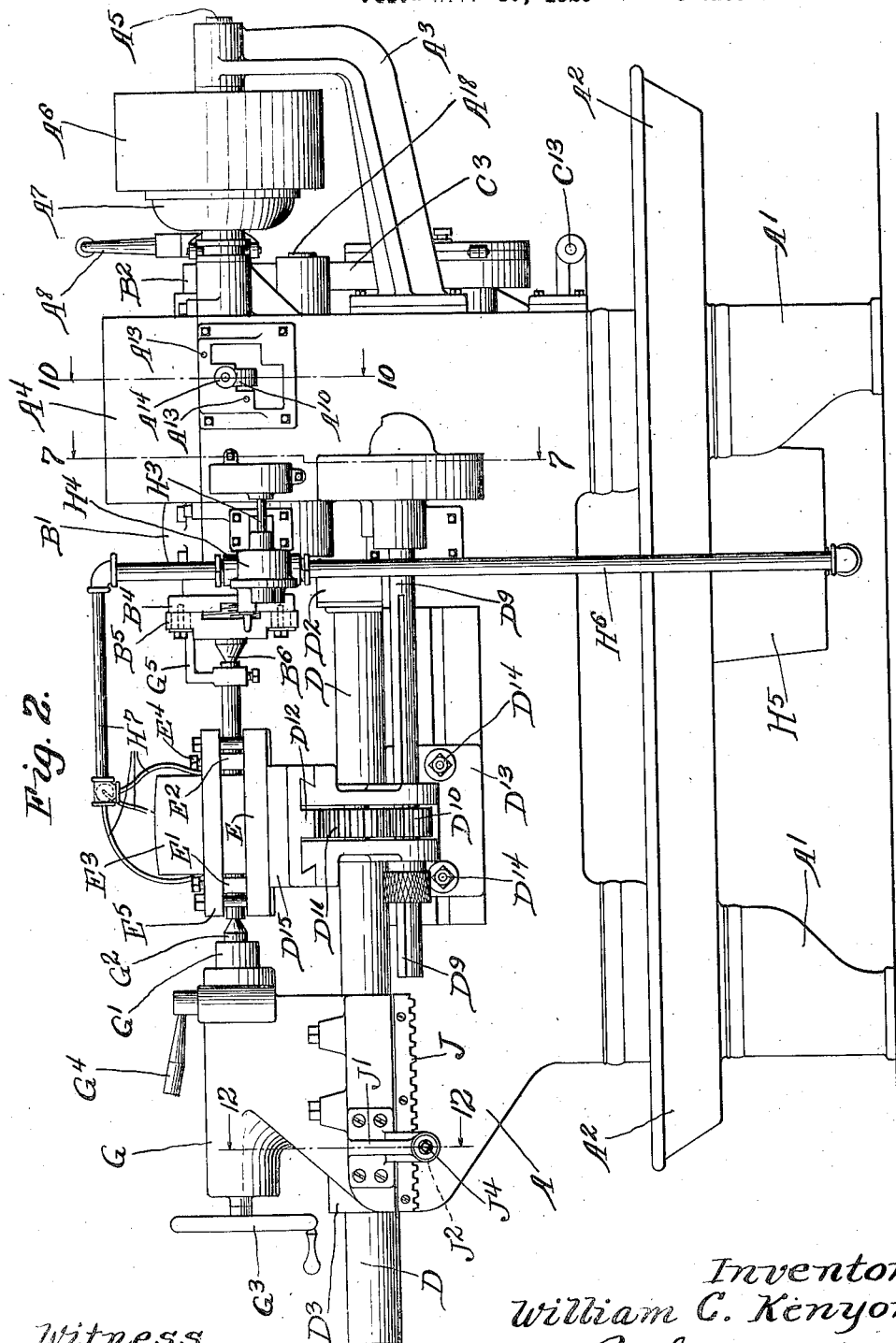

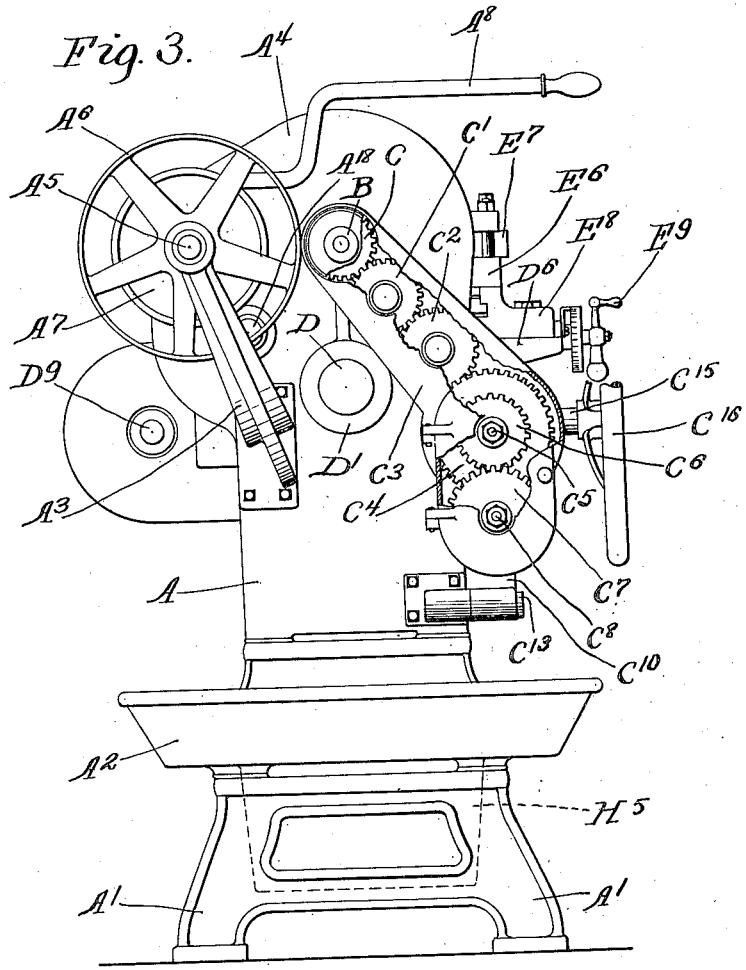

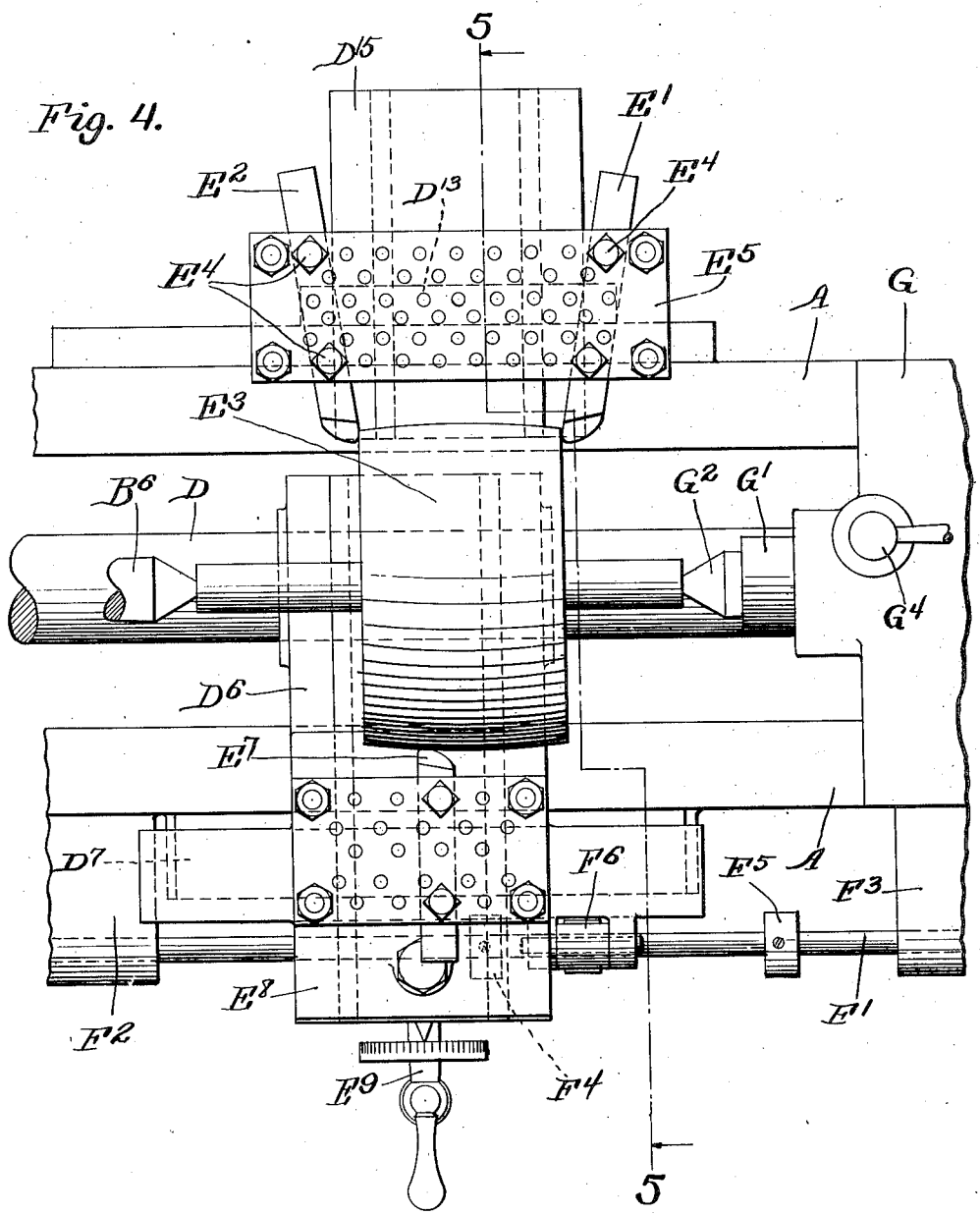

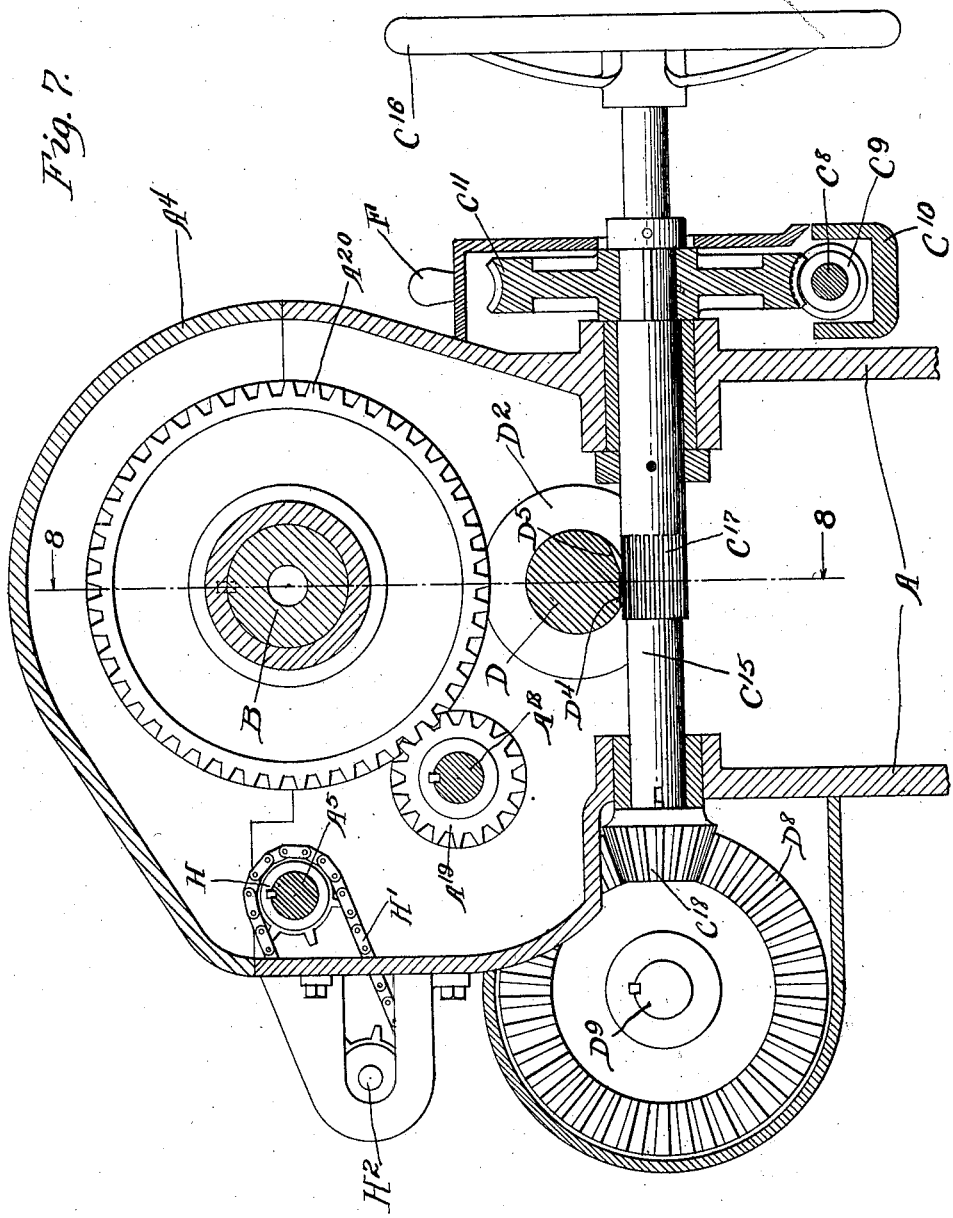

Dec. 8, 1925.

W. C. KENYON

LATHE

Filed Nov. 10, 1920      9 Sheets-Sheet 7

1,564,483

Witness
Edward T. Wray.

Inventor
William C. Kenyon
by Parker & Carter
Attorneys

Dec. 8, 1925.

W. C. KENYON

LATHE

Filed Nov. 10, 1920  9 Sheets-Sheet 8

1,564,483

Witness
Edward T. Wray.

Inventor
William C. Kenyon
by Parker & Carter
Attorneys

Dec. 8, 1925.  
W. C. KENYON  
1,564,483  
LATHE  
Filed Nov. 10, 1920  9 Sheets-Sheet 9

Witness  
Edward T. Wray

Inventor  
William C. Kenyon  
by Parker & Carter  
Attorneys

Patented Dec. 8, 1925.

1,564,483

UNITED STATES PATENT OFFICE.

WILLIAM C. KENYON, OF ROCKFORD, ILLINOIS, ASSIGNOR TO THE ROCKFORD MACHINE TOOL COMPANY, OF ROCKFORD, ILLINOIS, A CORPORATION OF ILLINOIS.

LATHE.

Application filed November 10, 1920. Serial No. 422,992.

*To all whom it may concern:*

Be it known that I, WILLIAM C. KENYON, a citizen of the United States, residing at Rockford, in the county of Winnebago and State of Illinois, have invented a certain new and useful Improvement in Lathes, of which the following is a specification.

My invention relates to improvements in lathes and refers particularly to lathes or turning machines of semi-automatic type wherein a plurality of cutting tools are used simultaneously on the work.

One object is to provide a new and improved form of simple and rigid lathe, another object is to provide a new and improved operating, controlling, and manipulating mechanism whereby the operator may have under his control power means for moving the tool carriage as the work is being done.

Other objects will appear from time to time in the specification.

Figure 1 is a front elevation showing the lathe at work;

Figure 2 is a rear elevation of the lathe shown in Figure 1;

Figure 3 is an end elevation;

Figure 4 is a plan view on an enlarged scale showing the work and the tool heads;

Figure 5 is a section along the line 5—5 of Figure 4;

Figure 6 is a section along the line 6—6 of Figure 5;

Figure 7 is a section along the line 7—7 of Figures 1 and 2;

Like parts are illustrated by like characters throughout the drawings.

Figure 8:
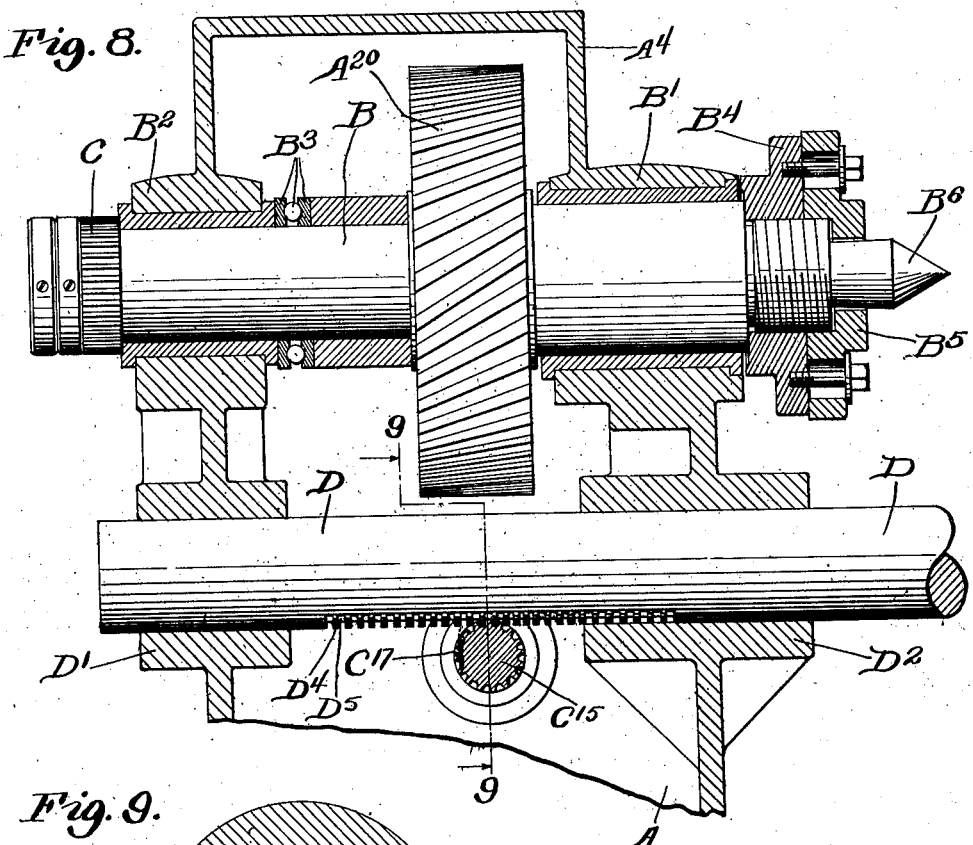
Figure 8 is a section along the line 8—8 of Figure 7.
Figure 9:
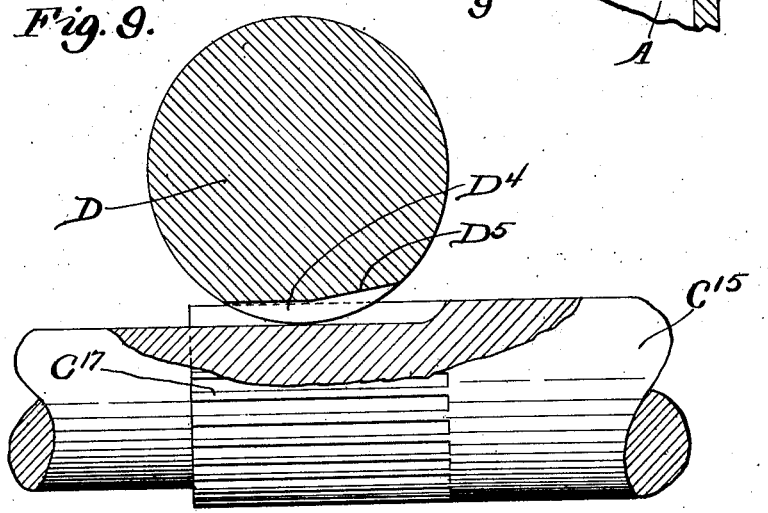
Figure 9 is a section on an enlarged scale along the line 9—9 of Figure 8.
Figure 11:
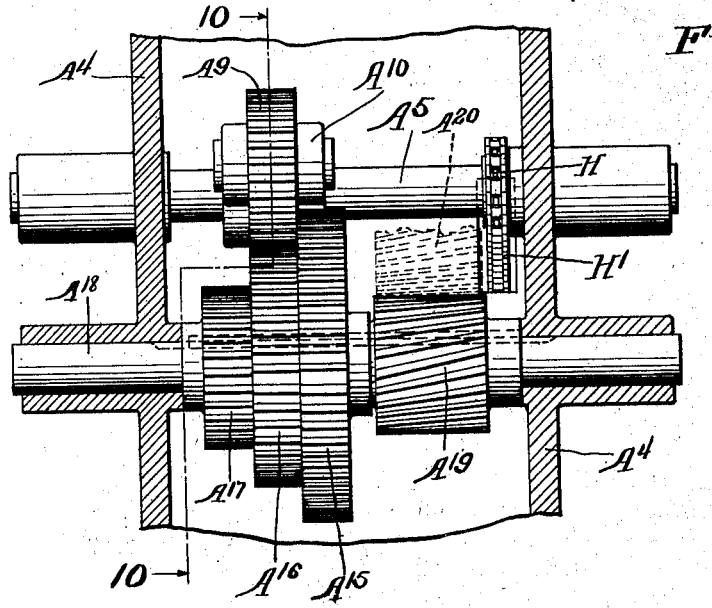
Figure 11 is a section along the line 11—11 of Figure 10.
Figure 10:
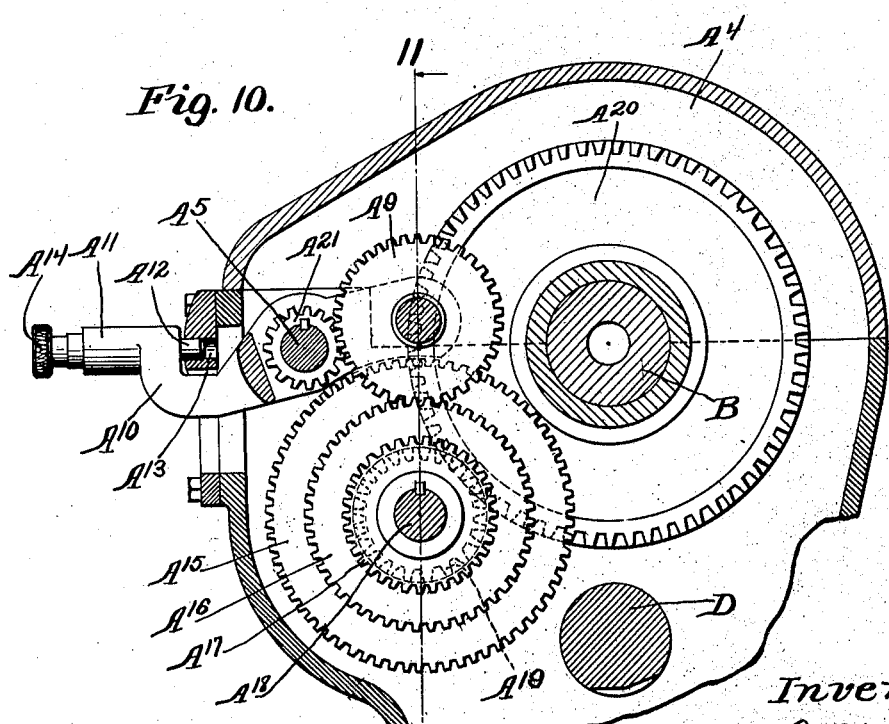
Figure 10 is a section along the line 10—10 of Figures 2 and 11.
Figure 12:
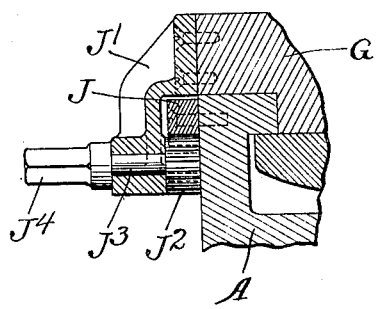
Figure 12, is a detail section along the line 12—12 of Figure 2.

A is a lathe bed supported on legs $A^1$ and provided with a tray or frame $A^2$, projecting outwardly and upwardly therefrom is a bracket $A^3$. $A^4$ is a gear case mounted on the lathe bed. $A^5$ is a pulley shaft supported in bearings on the bracket and the gear case. $A^6$ is the belt pulley through which power is applied to operate the lathe. $A^7$ is a clutch operated by a hand lever $A^8$ to connect and disconnect the pulley shaft $A^5$ with the pulley $A^6$. $A^{21}$ is a pinion mounted on the shaft $A^5$ in mesh with the idler gear $A^9$, which gear is mounted for rotation on the speed change lever $A^{10}$ and so arranged that it is always in mesh with the pinion $A^{21}$. The speed change lever $A^{10}$ has a handle $A^{11}$ projecting outwardly from the back side of the gear box and is provided with a stop pin $A^{12}$ adapted to engage stop holes $A^{13}$ and be manipulated by the handle $A^{14}$ whereby the idler gear $A^9$ may be brought selectively into mesh with the speed change gears $A^{25}$, $A^{16}$, $A^{17}$ on the intermediate shaft $A^{18}$. $A^{19}$ is a pinion keyed on the intermediate shaft $A^{18}$ and in mesh with the main drive gear $A^{20}$.

The gear $A^{20}$ is keyed on the spindle B, mounted in the heavy bearings $B^1$ $B^2$ and held against longitudinal movement of the thrust bearing $B^3$. The spindle B projects beyond the bearing $B^1$ and has rigidly screw threaded thereon a collar $B^4$ upon which is bolted the face plate $B^5$. The spindle also carries the usual type of center $B^6$ projecting through the face plate. When power is applied to the pulley and the clutch is in it is possible for the operator to have the spindle driven at any one of three selective speeds and thus the work may be rotated at a controllable rate of speed in the usual manner.

C is a gear rigidly mounted on the tail end of the spindle B, and in mesh with a chain of gears $C^1$ $C^2$ mounted in the housing $C^3$, the last gear of the chain being in mesh with a gear $C^4$ on a stud $C^5$. This gear carries the pinion $C^6$ in mesh with the removable gear $C^7$ on the feed shaft $C^8$, the gear $C^7$ and pinion $C^6$ being interchangeable with the usual set of removable gears for the purpose of changing the rate of speed in the usual manner, all these gears being contained within the lower extension of the housing $C^3$. The feed shaft $C^8$ has feathered on it, a worm $C^9$ and the shaft and worm are contained and guided in the trough shaped drop frame $C^{10}$. $C^{11}$ is a worm wheel adapted to be held in mesh with the worm by the latch $C^{12}$, and free to drop away by gravity when that latch is released, the drop frame when this occurs rotating about the pivot $C^{13}$, its fall being limited by the pin and slot $C^{14}$. The worm gear is keyed to the cross shaft $C^{15}$ which extends clear through the machine and has at its front end, a hand wheel $C^{16}$ carries intermediate its ends a gear $C^{17}$ and at its extreme rear end, a bevel gear $C^{18}$.

D is the main carriage supporting bar, slidably mounted in bearings $D^1$, $D^2$, $D^3$. It is provided with rack teeth $D^4$ in mesh with the gear $C^{17}$ and these rack teeth are cut in the round face of the shaft and in one side, extending back away from the normal point of engagement with the gear as shown at $D^5$. Rigidly mounted on the shaft D is a tool carriage $D^6$ which, on its outside end, is slidably supported on the lathe bed on a re-movable track $D^7$ and which is adapted, when the cross shaft is rotated to be moved longitudinally along the lathe bed. $D^8$ is a beveled gear in mesh with the pinion $C^{18}$ and keyed on the shaft $D^9$, on which shaft is a pinion $D^{10}$ in mesh with a gear $D^{11}$ which in turn is in mesh with a rack $D^{12}$. The pinion $D^{10}$ and gear $D^{11}$ and rack $D^{12}$ are all of them mounted on a bracket $D^{13}$ which, when in operation is fixed in position on the lathe but may be moved back and forth therealong by hand to be set up for different work, by the loosening up of the nuts and bolts $D^{14}$. The rack gear $D^{12}$ carries a tool slide $D^{15}$ also mounted on the bracket $D^{13}$.

The tool slide $D^{15}$ carries a tool head E which may be adjusted in position by the operator in the usual manner and this tool head is adapted to carry a plurality of facing tools such as the tools $E^1$, $E^2$ which in Figure 4 are shown ready to start cutting on both ends of the pulley or other similar piece of work $E^3$. These tools are held in place by bolts $E^4$ and holding plate $E^5$. The turning tool carriage $D^6$ carries another adjustable tool carrying head $E^6$ in which is removably mounted a lathe tool $E^7$. The head $E^6$ is mounted on a slide $E^8$ adapted to be fed along the carriage $D^6$ by a feed screw not shown, operated by a hand wheel $E^9$ whereby the operator can move the tool toward or from the work. The outer end of the carriage $D^6$ is provided with a trip or lathe member $E^{10}$ adapted to engage the face of the track $D^7$, the parts being so arranged that when the carriage is moved in the direction of the arrow in Figure 6, the point of the latch comes into engagement with the shaped face of the track $D^7$ and thus while it supports the carriage $D^6$, permits it to take a slight downward movement at certain points within its travel to move the tool $E^7$ toward or from the axis of the work thus giving for instance, a slight crown or taper to the pulley or other work. Upon the return movement of the carriage the latch will be by its frictional engagement with the track, be rotated back in a clockwise direction till the beveled surface engages the carriage $D^6$ thus permitting the carriage to drop clear down to free the tool from the work and it is to take care of this slight rotation of the carriage and bar D without interfering with the feed that the irregular shaped gear teeth $D^4$ $D^5$ are made in the bar D.

It is always possible to so set the position of the facing and turning tools that the work of these tools which take the shortest length of time may be done while the longer job is taking place and it makes no difference whether the turning or facing job is the longest, but it is necessary that when the longer of the two jobs has been completed, the feed shall automatically stop. This is provided for by means of a trip lever F adapted to control the latch $C^{12}$. This lever may be operated by hand. Normally it is operated by a trip rod $F^1$ slidable in bearings $F^2$ $F^3$ on the side of the lathe. Adjustably positioned stop collars $F^4$ $F^5$ are provided on this rod $F^1$ and a trip latch $F^6$ is dropped down from the carriage $D^6$ to travel between these collars and insure that when the tool has reached the limit of its excursion, the lever F will be tripped, thus releasing the latch permitting the frame to drop down to disengage the feed.

G is the tail stock adjustably bolted in position on the lathe bed. It contains a fixed spindle $G^1$ and center $G^2$. The spindle is of course, screw threaded inside the tail stock not here shown and the wheel $G^3$ is provided whereby the operator can tighten up on the work. $G^4$ is a lock lever provided so that the operator may clamp up the spindle so that the work may be held between the head and tail centers in a properly centered position. $G^5$ is a dog adapted to drive the work from the face plate. It will be obvious of course, that the arrangement I have shown is such that it could be used equally well for operating on work carried on the face plate without the tail stock at all.

H is a sprocket on the shaft $A^5$. It drives a sprocket chain $H^1$ which in turn drives a second sprocket $H^2$ and this second sprocket drives a pump shaft $H^3$. $H^4$ is the pump whereby oil is circulated from a reservoir $H^5$ through the pipe $H^6$ and distributing pipe $H^7$ to lubricate the work.

It will be understood, of course that while I have shown in my drawings an operative device and a preferred exemplification of my invention, nevertheless the drawings must be regarded as in a sense diagrammatic because I have merely shown one assumed tool arrangement and one assumed kind of work. Many different tools and many different tool supports might be applied interchangeably with the ones I have illustrated. The same is true of the work and many other changes might be made in size, shape and arrangement and operation of parts without departing materially from the spirit of my invention.

J is a rack on the lathe bed. J¹ is a bracket on the tail stock G. J² is a gear mounted on the shaft J³ in the bracket J¹ and in mesh with the rack J. The shaft is provided with a square head J⁴ by which a handle may be applied to rotate with the gear and move the tail stock along the lathe.

Figure 13:
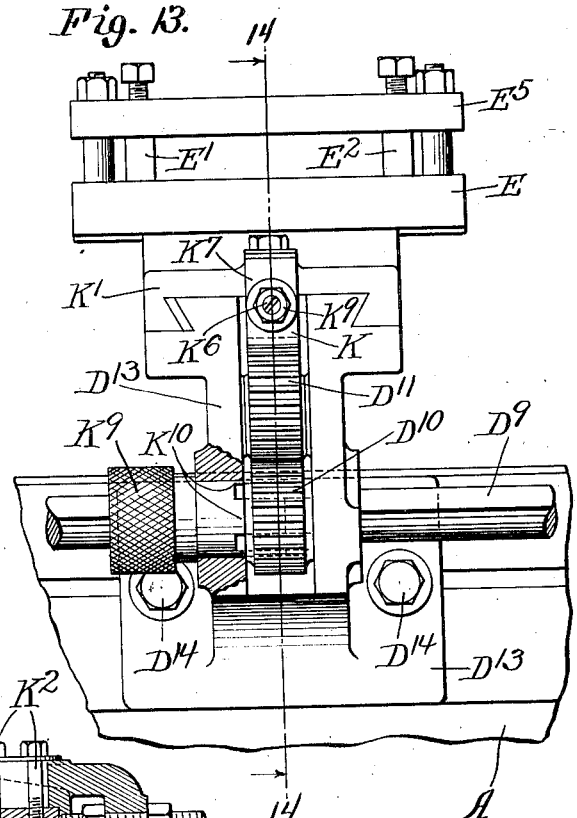
Figure 13 is a detail rear elevation of a modification of the facing tool holder.
Figure 14:
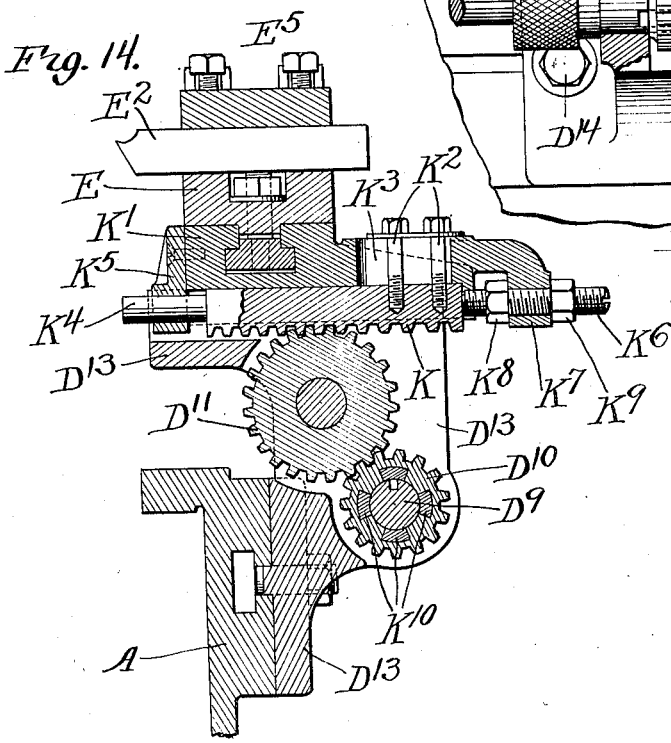
Figure 14 is a section along the line 14—14 of Figure 13.

In the modified form shown in Figs. 13 and 14 the gear D¹¹ is in mesh with the rack K. This rack rests against the underside of the slide K¹ and is adapted to be locked in adjustable position thereon by means of the cap bolt K² K² screw-threaded in the rack and slidable in the slot K³ K³. The front end of the rack is provided with a pin K⁴ slidable in a bracket K⁵. The rear end is provided with a bolt K⁶ passing through a bracket K⁷. Nut K⁸ is screw-threaded on the bolt and adapted to be tightened up against the bracket, the idea being, that when the cap screws are loosened up, the nuts may be operated to move the rack longitudinally with respect to the slide, thus making it possible for the operator to closely adjust the position of the tool with respect to the work. This adjustment in cooperation with the adjustment provided by the clutch collar K⁹ which is feathered on the shaft, D⁹ and has teeth K¹⁰ adapted to engage teeth in the pinion D¹⁰ which pinion is rotatably mounted on the shaft, makes it possible to set the tool to commence to cut at any time at the will of the operator. The importance of this is, that it makes it possible to adjust the operation of the cutting tools in synchronism so as to assure proper cooperation of the tools.

The use and operation of my invention are as follows:

The operator sets up the work in the usual manner by putting it on the mandrel and centering it on the centers on the head stock and tail stock, moving the tail stock up, clamping it in place, tightening the center, and clamping it in place in the usual way. If, as in the case I have shown, he is going to cut the face of the pulley and the sides at the same time, he will set his longitudinally movable tool carriage at the proper position to commence the feed and will set up the tool so that as the feed commences the tool will cut. He will then release the clutch on the back of the machine and move the cross feed tool carriage up until it is about ready to start work. He then throws the clutch in. It will probably, happen, however, that the clutch will not be at just the right point to start the feed, and he will therefore loosen the bolts shown in Fig. 14 and by manipulating the nuts move the rack with respect to the tool carriage back or forward until the tools are at the right point to begin the cut. He will then start the machine and both sets of tools will cut simultaneously. As the longitudinally cut carriage moves along the triangular trigger member riding on the bracket on the front of the lever, it will gradually move down into the curved depression therein, thus rotating the tool carriage. As this rotation takes place the tool will move outward from the axis of rotation to cut the crown on the pulley as shown, and as the carriage goes further the tool will be gradually moved back toward the center as it goes over the crown.

As the end of the excursion is reached the trip lever shown in the front of the machine, will engage the release collar, which will have previously been set at the right point, and that releases the latch which holds the worm up and the worm drops out of mesh with the worm gear, and any feeding of the tools stops.

When the operator starts to reverse the tools, particularly the front tool for cutting, the face of the pulley, the backward movement causes the triangular latch member to rotate a short distance so as to decrease the distance between its feed and the bracket, and that permits the tool to drop down still further so as to clear the work altogether. It will be noted that this rotation of the shaft does no harm so far as the feed is concerned because no matter what the position the shaft is, the curved tail on the rack will come in contact with the pin and driving of the rack can take place at all times.

I claim:

1. In an engine lathe a plurality of tool carriages a driving shaft normal to the lathe axis having a plurality of gears thereon, a rack in mesh with one of them and directly connected to one of the carriages, a shaft parallel with the lathe axis, a mitre gear thereon in mesh with the other gear and a rack carrying the second carriage and a gear mounted on the second shaft adapted to drive the rack to move the second carriage in a direction normal to the direction of the movement of the first.

2. In an engine lathe, a single transverse feed driving shaft, tool carriages driven therefrom through independent gear trains, a worm wheel thereon, a worm shaft and a worm in mesh with the worm wheel, means for driving said worm shaft from the lathe drive, the worm and gear being mounted for rotation about an axis parallel with the worm wheel axis, and a latch adapted to hold the worm and gear in mesh, means for separately disconnecting one of the carriages from the driving means.

3. In an engine lathe, a plurality of tool carriages a driving shaft normal to the lathe axis having a plurality of gears thereon, a rack in mesh with one of them and directly connected to one of the carriages, a shaft parallel with the lathe axis, a mitre gear thereon in mesh with the other gear, and a rack carrying the second carriage and a gear mounted on the second shaft adapted to drive the rack to move the second carriage in a direction normal to the direction of the movement of the first, mean for separately disconnecting one of the carriages from the driving means.

4. In an engine lathe a plurality of tool carriages and means for driving them from a single power source, means for independently either connecting or disconnecting one of them from the drive, said means comprising a drive shaft, a manually operated collar formed with clutch teeth, feathered thereon, and a pinion having clutch teeth adapted to be engaged by the teeth of the collar and rotatably mounted on the shaft.

5. In an engine lathe a tool carriage, a rack associated therewith, and a gear adapted to drive the rack longitudinally, means for adjusting the rack longitudinally with respect to the tool carriage, said means comprising a sliding support for the rack on the tool carriage, a screw-threaded member in opposition to the carriage and engaging the rack, whereby the rack may be adjusted, and means for separately clamping the rack in position with respect to the carriage.

Signed at Chicago, county of Cook and State of Illinois, this 30th day of October, 1920.

WILLIAM C. KENYON.